Jan. 13, 1970  G. KNAUER ET AL  3,489,969
STARTING SWITCH CIRCUIT FOR SINGLE PHASE ELECTRIC MOTORS
Filed June 30, 1967
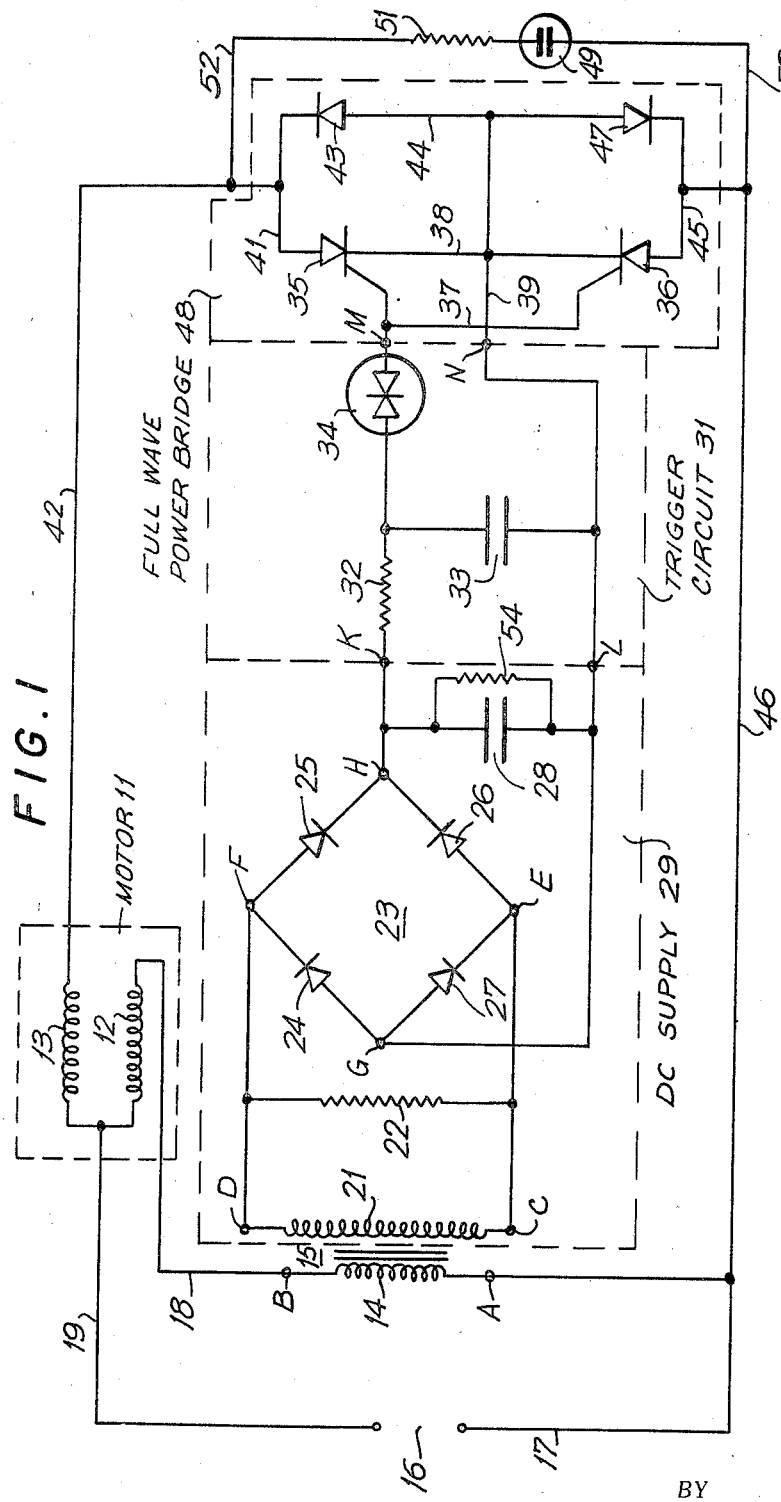
INVENTORS
GILBERT KNAUER
JULIUS KNAUER
JOSEPH KNAUER
BY
Daniel Jay Tick
ATTORNEY United States Patent Office 3,489,969
Patented Jan. 13, 1970

3,489,969
STARTING SWITCH CIRCUIT FOR SINGLE PHASE ELECTRIC MOTORS
Gilbert Knauer, 122 Ashland Place, Brooklyn, N.Y. 11201; Julius Knauer, 94 Woods Road, North Babylon, N.Y. 11703; and Joseph Knauer, 1217 E. 98th St., Brooklyn, N.Y. 11236
Filed June 30, 1967, Ser. No. 650,331
Int. Cl. H02p 1/16
U.S. Cl. 318—221                10 Claims

ABSTRACT OF THE DISCLOSURE

A pulse producing circuit including a relaxation oscillator type trigger circuit is coupled between a source of AC voltage and the gate electrode of each of a pair of silicon controlled rectifiers. The pulse producing circuit derives from the current through the main winding of a motor and applies to the gate electrodes of the silicon controlled rectifiers a DC pulse having a magnitude which is sufficient to switch the silicon controlled rectifiers to their conductive condition each time the pulse is applied to the gate electrodes as long as the current through the main winding and the pulse are above determined magnitudes. The magnitude or amplitude levels of the pulse remain constant as the current through the main winding increases although the frequency of the pulses increases with increased current. The magnitude of the current through the main winding and the magnitude of the pulse fall below the corresponding determined amplitudes when the speed of the electric motor increases above a determined speed. The silicon controlled rectifiers couple the starting winding of the motor to the source of A voltage so they connect the starting winding to the AC source when they are in conductive condition and they disconnect the starting winding from the AC source when they are in non-conductive condition.

CROSS-REFERENCE TO RELATED APPLICATION

The present invention strives for the same objectives as pending patent application Ser. No. 592,008, filed Nov. 4, 1966 for "Starting Switch Circuits for Single Phase Electric Motors," and now abandoned.

BACKGROUND OF THE INVENTION

Field of the invention

The present invention relates to a starting switch circuit for single phase electric motors. More particularly, the invention relates to a silicon controlled rectifier circuit for starting or switching single phase electric motors.

Description of the prior art

In starting switch circuits of the prior art for starting electric motors, mechanical switches are utilized. The mechanical switches may comprise, for example, conventional centrifugal switches or relays and are subject to arcing, considerable wear of moving parts and difficulties such as, for example, unreliability of operation and the like. Furthermore, starting switch circuits of the prior art are critical in operating characteristics, so that they must be adjusted for each motor they are utilized with.

SUMMARY OF THE INVENTION

The principal object of the present invention is to provide a new and improved starting switch circuit for single phase electric motors. The operating characteristics of the starting switch circuit of the present invention are noncritical, so that it does not require adjustment for each motor it is utilized with. The starting switch circuit of the present invention is compact, rugged, reliable, efficient, and effective in operation, devoid of moving parts, and simple in structure and in its connections to an electric motor circuit. The starting switch circuit of the present invention does not require inspections, maintenance or repair and does not arc or wear. The starting switch circuit of the present invention is safe to use and may be utilized without difficulty or danger in dangerous locations. The starting switch circuit of the present invention may be encapsulated with facility and may be housed in a normal splice or terminal box with convenience and without concern or difficulty even if it contacts wire or metal therein.

The starting switch circuit of the present invention is non-critical because it switches ON and switches OFF at the same magnitude or level of current. The non-critical characteristic of the starting switch circuit of the present invention, which may be termed non-differential or pull in and drop out, enables the utilization of said starting switch circuit in a wider range of applications than critical switches. The starting switch circuit of the present invention, due to its non-critical or non-differential characteristic, is less sensitive to dynamic changes in current through the main winding of the motor caused by line voltage fluctuations.

In accordance with the present invention, a noncritical starting switch circuit for an electric motor having a main winding and a starting winding comprises a source of AC voltage having a determined frequency coupled to the main winding for energizing the main winding and the starting winding. A coupling circuit couples the starting winding to the source of AC voltage. The coupling circuit comprises silicon controlled rectifier means having a conductive condition and a non-conductive condition and gate means for controlling the conductive condition of the silicon controlled rectifier means. A pulse producing circut includes a relaxation oscillator type trigger circuit coupled between the source of AC voltage and the gate means of the silicon controlled rectifier means for deriving from the current through the main winding and applying to the gate means a pulse having a magnitude sufficient to switch the silicon controlled rectifier means to its conductive condition each time the pulse is applied to the gate means as long as the current through the main winding and the pulse are above determined magnitudes. The magnitude of the current through the main winding and the magnitude of the pulse fall below the corresponding determined magnitudes when the speed of the electric motor increases above a determined speed. The silicon controlled rectifier means connects the starting winding to the source of AC voltage when it is in its conductive condition and disconnects the starting winding from the source of AC voltage when it is in its nonconductive condition.

The silicon controlled rectifier means comprises a pair of silicon controlled rectifiers and the gate means of each of the silicon controlled rectifiers comprises a gate electrode connected to the relaxation oscillator type trigger circuit of the pulse producing circuit. The coupling circuit comprises a rectifier bridge having an output. A relaxation oscillator type trigger circuit has an input connected to the output of the rectifier bridge and an output. The silicon controlled rectifiers are connected to the output of the relaxation oscillator type trigger circuit. The relaxation oscillator type trigger circuit has two output terminals. Each of the silicon controlled rectifiers comprises a cathode directly connected to the cathode of the other and to one of the output terminals and an anode coupled to the one of the output terminals and to the source of AC voltage. The gate electrode of each of the silicon controlled rectifiers is directly connected to the other of the output terminals.

A smoothing capacitor is connected across the output of the rectifier bridge and a calibrating resistor is connected in the input of the rectifier bridge. Each of a pair of diodes couples the one of the output terminals to the anode of a corresponding one of the silicon controlled rectifiers. One of the diodes provides a current path from the cathode of one of the silicon controlled rectifiers to the source of AC voltage and the other of the diodes provides a current path from the cathode of the other of the silicon controlled rectifiers to the source of AC voltage. A signal device is connected across the pair of silicon controlled rectifiers for indicating the conductive condition thereof. The signal device is connected between the anodes of the silicon controlled rectifiers.

BRIEF DESCRIPTION OF THE DRAWING

In order that the present invention may be readily carried into effect, it will now be described with reference to the accompanying drawing, wherein:

FIG. 1 is a circuit diagram of an embodiment of the starting switch circuit of the present invention for single phase electric motors;

FIG. 2 is an embodiment of a calibrating resistor which may replace the calibrating resistor of FIG. 1; and FIG. 3 is another embodiment of a calibrating resistor which may replace the calibrating resistor of FIG. 1.

DESCRIPTION OF THE PREFERRED EMBODIMENT

In FIG. 1, a single phase electric motor 11 comprises a main stator winding 12 and a starting or phase winding 13. If desired, the motor 11 may further comprise a starting capacitor (not shown in the figures) connected in series with the starting winding 13. The rotor of the electric motor 11 is not shown in FIG. 1 in order to enhance the clarity of illustration.

The main winding 12 of the electric motor 11 is connected in series with the primary winding 14 of a transformer 15 and a power source 16 of AC voltage of approximately 115 to 120, or 230 volts, or of any suitable voltage at any suitable power frequency such as, for example, 30, 500, 60, or any suitable number of cycles per second. Thus, one end terminal A of the primary winding 14 is connected to one terminal of the AC source 16 via a line 17. The other end terminal B of the primary winding 14 is connected to one end of the main winding 12 via a line 18 and the other end of said main winding is connected to the other termnial of the AC source 16 via a line 19.

The transformer 15 functions as a current sensor and produces at its secondary winding 21 a secondary voltage proportional to the primary current in its primary winding 14. A calibrating resistor 22 is connected across the terminals C and D of the secondary winding 21 of the transformer 15. The calibrating resistor 22 is utilized to calibrate the starting switch circuit for use with different motors. The calibrating resistor 22 is connected across the input terminals E and F of a full wave rectifier bridge 23.

Although the calibrating resistor 22 is illustrated in FIG. 1 as a shunt resistor, connected across the terminals C and D of the secondary winding 21 of the transistor 15 and across the input terminals E and F of the full wave rectifier bridge 23, any suitable type and connection of calibrating resistor may be utilized. Thus, for example, a voltage divider or variable resistor 22', as shown in FIG. 2, may be utilized as the calibrating resistor of FIG. 1. The terminals C, D, E and F of FIG. 2 are identical with those of FIG. 1. A series connected resistor 22", as shown in FIG. 3, may be utilized as the calibrating resistor of FIG. 1. The terminals C, D, E and F of FIG. 3 are identical with those of FIG. 1.

The rectifier bridge 23 may comprise any suitable rectifier arrangement for rectifying AC to DC such as, for example, a full wave rectifier, as shown in FIG. 1, a half wave rectifier, a center-tapped full wave rectifier, or other suitable type. The rectifier bridge 23 has output terminals G and H. The rectifier 23 is of known type and comprises suitable known rectifiers or diodes 24, 25, 26 and 27 such as, for example, silicon rectifiers connected in a known rectifier bridge circuit, which in FIG. 1 is a full wave rectifier bridge circuit.

The DC signal provided at the output terminals G and H of the rectifier bridge 23 is filtered or smoothed by any suitable filter arrangement such as, for example, a smoothing or filter capacitor 28 connected across said output terminals. The filtered or smooth DC signals are provided at a pair of terminals K and L which function as the output terminals of the DC supply 29 and the input terminals of a relaxation oscillator type trigger circuit 31.

The calibrating resistor 22, 22' or 22" need not be connected in the input of the rectifier bridge 23, but may be connected in the output of said full wave rectifier bridge, either between said rectifier bridge and the filter capacitor 28 or between said filter capacitor and the terminals K and L.

The relaxation oscillator type trigger circuit 31 may comprise any suitable type of relaxation oscillator which functions as a trigger circuit to provide a firing pulse to switch the silicon controlled rectifiers as hereinafter described, to their conductive condition. A relaxation oscillator provides a markedly non-sinusoidal output waveform and is called a relaxation oscillator because its oscillations are characterized by sudden change or relaxation from one state of unstable equilibrium to another. Those oscillators having a circuit in which the oscillation is produced through the periodic charge and discharge of a capacitor in series with a resistor were first called relaxation oscillators. Accordingly, relaxation oscillators have often been defined as those in which combinations of resistance and capacitance determine the frequency.

The relaxation oscillator type trigger circuit 31 comprises an RC circuit having a resistor 32 and a capacitor 33, and an avalanche device 34 such as, for example, a neon lamp or a semiconductor device known as a diac and manufactured by the General Electric Company. The resistor 32 is connected in series between the terminal K and one of the electrodes of the avalanche device 34. The capacitor 33 is connected between the terminal L and a common point in the connection between the resistor 32 and the avalanche device 34. The diac is a known semiconductor device and is described in the "Silicon Controlled Rectifier Manual," third edition, 1964, and fourth edition, 1966, General Electric Company, Auburn, N.Y. A diac is a multilayer semiconductor trigger diode of the type described on pages 66 and 67 of the aforementioned 1964 edition. The diac may be utilized to trigger a pair of parallel-inverse connected silicon controlled rectifiers.

The resistor 32 charges the capacitor 33 at a charging rate determined by the time constant R32C33 or the resistance of said resistor times the capacitance of said capacitor. When the voltage across the capacitor 33 reaches the breakdown or avalanche points of the avalanche device 34, the impedance of said avalanche device decreases abruptly and sharply so that said avalanche device provides at its output a sharp current pulse of approximately 100 milliamperes. The pulse provided at the output terminal M of the trigger circuit 31 has sufficient magnitude to fire a pair of silicon controlled rectifiers or SCR's 35 and 36 in accordance with the cycling of the voltage provided by the source 16 of AC voltage.

A silicon controlled rectifier or SCR is a known semiconductor device and is described in the "Silicon Controlled Rectifier Manual," second edition, 1961, General Electric Company, Auburn, N.Y. An SCR conducts current in only one direction and serves both to control and rectify. The SCR is an ON-OFF switch and can be turned on by a momentary such as, for example, fraction of a microsecond, application of control current to its control electrode or gate. An SCR is a three terminal solid state thyristor which functions like a thyratron gas tube. When a positive voltage is applied across the anode and cathode terminals and a positive signal is applied to the control, gate or trigger electrode, the SCR fires and conducts current. Once the SCR is fired, the trigger or firing pulse or signal may be removed without terminating the conductive condition of the SCR. The conductive condition is terminated and the SCR is switched to its non-conductive condition when the positive voltage is removed from the anode-cathode terminals.

The trigger circuit 31 has two output terminals M and N. Each of the SCR's 35 and 36 has an anode, a cathode and a control electrode or gate. The gate of each of the SCR's 35 and 36 is directly connected to that of the other and to the output terminal M via a line 37. The cathode of each of the SCR's 35 and 36 is directly connected to that of the other and to the output terminal N via a line 38 and a line 39, respectively.

The anode of the SCR 35 is connected to one end of the starting or phase winding 13 of the motor 11 via a line 41 and a line 42, and is coupled to the output terminal N via the line 41, a first diode 43, a line 44 and the line 39. The cathode of the first diode 43 is connected to the anode of the SCR 35 and the anode of said first diode is connected to the output terminal N. The anode of the SCR 36 is connected to the other end of the starting winding 13 of the motor 11 via a line 45, a line 46, the source 16 of AC voltage and the line 19, and is coupled to the output terminal N via the line 45, a second diode 47, the line 44 and the line 39. The cathode of the second diode 47 is connected to the anode of the SCR 36 and the anode of said second diode is connected to the output terminal N.

The first diode 43 provides a curernt path from the cathode of the SCR 36 to the source 16 of AC voltage via the starting winding 13 of the motor 11. The second diode 47 provides a current path from the cathode of the SCR 35 to the source 1 of AC voltage. The SCR's 35 and 36 and the diodes 43 and 47 function as a full wave power bridge 48, with each of the SCR's 35 and 36 operating in its conductive condition for a determined half cycle of the line voltage provided by the AC source 16. Thus, each of the SCR's operates in its conductive condition intermittently.

A signal device 49, which may comprise a lamp, a buzzer or any suitable electrical indicator or signaller, is connected across the pair of SCR's 35 and 36. The signal device 49 functions to indicate the condition of energization or conduction of the SCR's 35 and 36. One terminal of the signal device 49 is connected to the anode of the SCR 35 via a resistor 51, a line 52 and the lines 42 and 41. The other terminal of the signal device 49 is connected to the anode of the SCR 36 via a line 53 and the lines 46 and 45.

When the SCR's 35 and 36 are non-conductive, not firing, or OFF, the energizing circuit of the starting winding 13 of the motor 11 is open and said starting winding is disconnected from the AC source 16. When either of the SCR's 35 and 36 is conductive, firing, or ON, the energizing circuit of the starting winding 13 of the motor 11 is closed and said starting winding is connected to the AC source 16.

The main winding 12 of the electric motor 11 and the primary winding 14 of the transformer 15 are energized by the AC source 16. Since the main winding 12 and the primary winding 14 are connected in series, the same current flows through both said windings. The output of the transformer 15 is proportional to the magnitude of the current flowing through its primary winding 14. When the electric motor 11 is started, the current through the main winding 12 has a high magnitude which, after rectification and shaping, is of sufficient magnitude to fire the SCR's 35 and 36, so that said SCR's are conductive or ON alternately, for half a cycle each, and the starting winding 13 of said motor is connected in the circuit and is energized. The SCR's 35 and 36 are triggered by approximately 300 pulses per cycle or 18,000 pulses per second.

As the speed of the electric motor 11 increases, the current through the main winding 12 decreases in magnitude until it falls to a magnitude which, after rectification and shaping, is insufficient to fire the SCR's 35 and 36, so that said SCR's are switched OFF or to their non-conductive condition, and the starting winding 13 of said motor is disconnected from the circuit and is deenergized.

Since the SCR's 35 and 36 are fired by 18,000 pulses per second, the operating characteristic of the starting switch circuit of the present invention is non-critical, so that said circuit does not require adjustment for each motor it is utilized with. This is a considerable advantage over known starting switch circuits, which require adjustment for each motor they are used with. The pulses remain constant in magnitude after firing of the SCR's, as the current in the main winding 12 increases. The pulses are unaffected by temperature changes since the Diac 34 is temperature stable. The frequency or repetition rate of the pulses varies with variation of the magnitude of the current through the main winding 12.

The firing point, at which the SCR's are fired, is the same as the dropout point, at which said SCR's are switched OFF.

A resistor 54 is connected in shunt across the filter capacitor 28. The resistor 54 functions as a bleeder to bleed off the capacitor 28 charge in order to provide an instantaneous release.

While the invention has been described by means of specific examples and in specific embodiments, we do not wish to be limited thereto, for obvious modifications will occur to those skilled in the art without departing from the spirit and scope of the invention.

What we claim is:

1. A non-critical starting switch circuit for an electric motor having a main winding and a starting winding, said starting switch circuit providing complete cycle conduction comprising a source of AC voltage having a determined frequency coupled to said main winding for energizing said main winding and said starting winding;

coupling means coupling said starting winding to said source of AC voltage, said coupling means comprising rectifier means coupled to said AC voltage source for rectifying said AC voltage, smoothing means connected to said rectifier means for smoothing the rectified voltage, silicon controlled rectifier means having a conductive condition and a non-conductive condition and gate means for controlling the conductive condition of said silicon controlled rectifier means; and pulse producing means including a temperature-stable relaxation oscillator type trigger circuit coupling said smoothing means to the gate means of said silicon controlled rectifier means for deriving from the current through said main winding and applying to said gate means random high frequency pulses having a magnitude sufficient to switch said silicon controlled rectifier means to its conductive condition each time said pulse is applied to said gate means at the beginning of each cycle as long as the current through said main winding and said pulse are above determined magnitudes, the magnitude of the current through said main winding and therefore the magnitude of said pulse falling below the corresponding determined magnitudes when the speed of said electric motor increases above a determined speed, said silicon controlled rectifier means connecting said starting winding to said source of AC voltage when it is in its conductive condition and disconnecting said starting winding from said source of AC voltage when it is in its non-conductive condition.

2. A non-critical starting switch circuit as claimed in claim 1, wherein said silicon controlled rectifier means comprises a pair of silicon controlled rectifiers and the gate means of each of said silicon controlled rectifiers comprises a gate electrode connected to the relaxation oscillator type trigger circuit of said pulse producing means.

3. A non-critical starting switch circuit as claimed in claim 1, wherein said coupling means comprises a rectifier bridge having an output, a relaxation oscillator type trigger circuit having an input connected to the output of said rectifier bridge and an output, and silicon controlled rectifier means connected to the output of said relaxation oscillator type trigger circuit.

4. A non-critical starting switch circuit as claimed in claim 2 wherein said relaxation oscillator type trigger circuit has two output terminals and each of said silicon controlled rectifiers comprises a cathode directly connected to the cathode of the other and to one of said output terminals and an anode coupled to said one of said output terminals and to said source of AC voltage, the gate electrode of each of said silicon controlled rectifiers being directly connected to the other of said output terminals.

5. A non-critical starting switch circuit as claimed in claim 3, further comprising a smoothing capacitor connected across the output of said rectifier bridge and a calibrating resistor, said rectifier bridge having an input and said calibrating resistor being connected in the input of said rectifier bridge.

6. A non-critical starting switch circuit as claimed in claim 3, wherein said relaxation oscillator type trigger circuit comprises a multilayer semiconductor trigger diode.

7. A non-critical starting switch circuit as claimed in claim 4, further comprising a pair of diodes each coupling said one of said output terminals to the anode of a corresponding one of said silicon controlled rectifiers, one of said diodes providing a current path from the cathode of one of said silicon controlled rectifiers to said source of AC voltage and the other of said diodes providing a current path from the cathode of the other of said silicon controlled rectifiers to said source of AC voltage.

8. A non-critical starting switch circuit as claimed in claim 4, wherein said coupling means comprises a full wave rectifier bridge having an input and an output and a relaxation oscillator type trigger circuit connected to the output of said full wave rectifier bridge, and further comprising a calibrating resistor connected in the input of said full wave rectifier bridge.

9. A non-critical starting switch circuit as claimed in claim 4, further comprising signal means connected across the pair of silicon controlled rectifiers for indicating the conductive condition thereof.

10. A non-critical starting switch circuit as claimed in claim 7, wherein said coupling means comprises a full wave rectifier bridge having an input and an output and a relaxation oscillator type trigger circuit connected to the output of said full wave rectifier bridge, and further comprising a calibrating resistor connected in the input of said full wave rectifier bridge and signal means connected between the anodes of said silicon controlled rectifiers for indicating the conductive condition thereof.

References Cited

UNITED STATES PATENTS

| | | | |
|---|---|---|---|
| 3,226,620 | 12/1965 | Elliot et al. | 318—221 |
| 3,307,093 | 2/1967 | Wright | 318—221 |

ORIS L. RADER, Primary Examiner

G. RUBINSON, Assistant Examiner

U.S. Cl. X.R.

318—227